Jan. 22, 1935.  L. G. OLANDER  1,988,630
CONVERTED MELTING POT STRUCTURE
Filed April 7, 1934  2 Sheets-Sheet 1
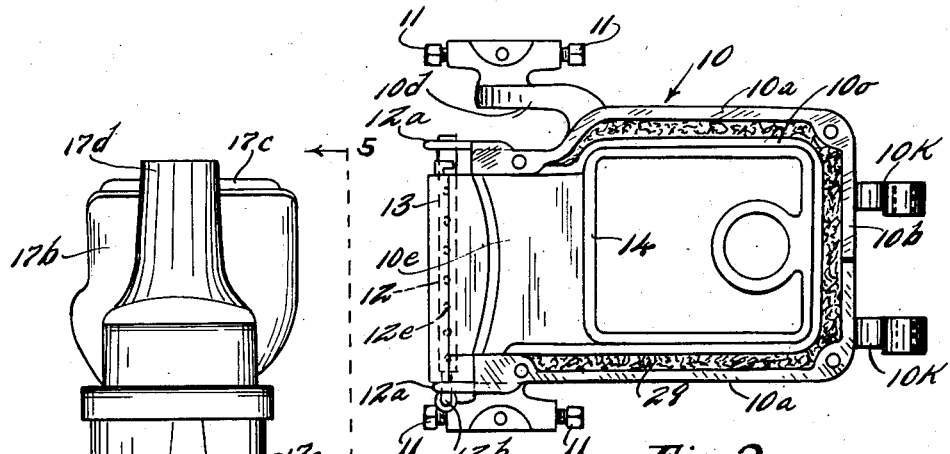
Fig. 2.
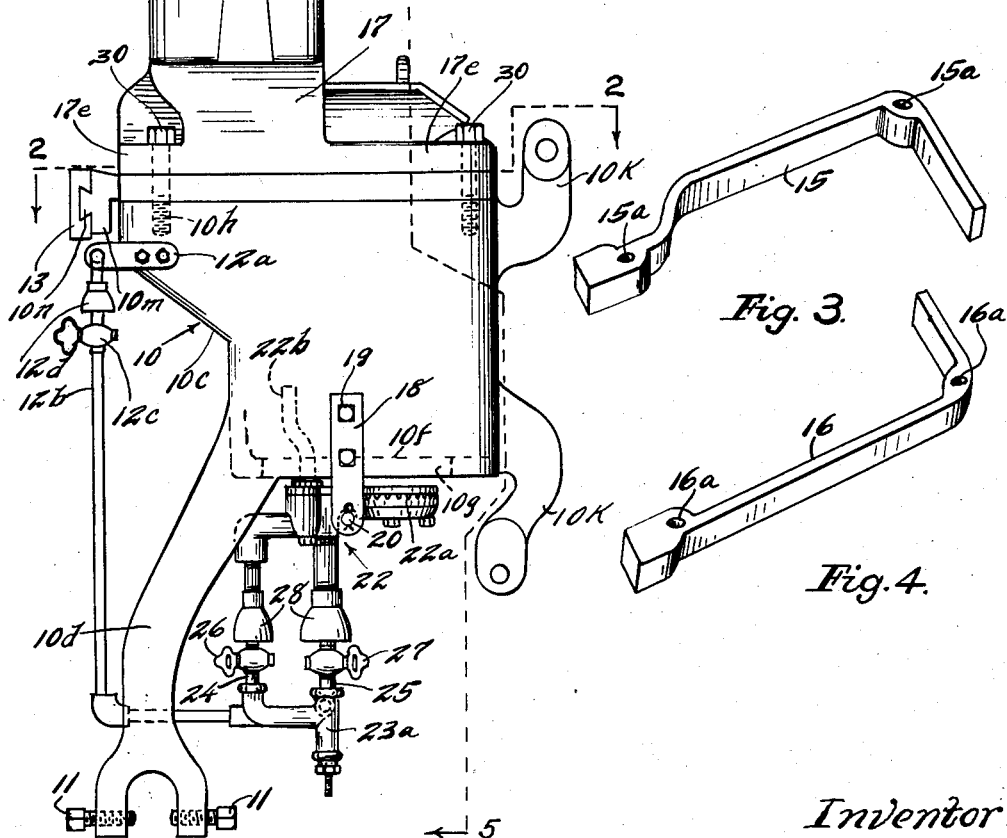
Fig. 3.
Fig. 4.
Fig. 1.
Inventor
LEONARD G. OLANDER
By Chas. C. Reif
Attorney Jan. 22, 1935. L. G. OLANDER 1,988,630
CONVERTED MELTING POT STRUCTURE
Filed April 7, 1934 2 Sheets-Sheet 2

Inventor
LEONARD G. OLANDER
By
Chas. C. Reif.
Attorney

Patented Jan. 22, 1935

1,988,630

UNITED STATES PATENT OFFICE 1,988,630

CONVERTED MELTING POT STRUCTURE

Leonard G. Olander, Minneapolis, Minn., assignor to The Monomelt Company Incorporated, Minneapolis, Minn., a corporation of Minnesota Application April 7, 1934, Serial No. 719,499

10 Claims. (Cl. 22—71)

This invention relates to a melting pot structure for a type setting machine. Type setting machines are now in common use and the same comprise a melting pot containing the molten type metal which is forced against the matrix to make the type slugs. A great many of such machines have been equipped with an auxiliary melting pot structure in which is placed used slugs and other pieces of type metal. These are melted in the auxiliary melting pot and the molten type metal is fed to another melting pot from which it is forced against the matrix.

It is also common to heat the melting pots both by means of a gas burner and by electrical heating means, some machines using one type of heating and other machines using the other. It is desirable and necessary in some instances to convert the standard electrically heated melting pot of the type setting machine to the type using a gas burner in place of the electrical heating means. This necessitates providing a cover for the melting pot casing having means for carrying away the gases of combustion from the gas burner, and forming a passage to said means from said burner. Other changes are also necessary all of which form part of the present invention.

It is an object of this invention to provide a simple, novel and efficient melting pot structure having a gas heating means, the same being converted from a melting pot structure of a standard type setting machine using an electrical heating means.

It is another object of the invention to provide a novel method of converting the electrically heated melting pot structure of a standard type setting machine to a gas heated melting pot structure having a suitable cover for the melting pot casing.

These and other objects and advantages of the invention will be fully set forth in the following description made in connection with the accompanying drawings, in which like reference characters refer to similar parts throughout the several views and in which:—

Fig. 1 is a view in side elevation of the melting pot structure of the converted machine;

Fig. 2 is a horizontal section taken on line 2—2 of Fig. 1 as indicated by the arrows;

Figs. 3 and 4 are respectively prospective views of certain converting members used;

Figures 5, 6, 7:
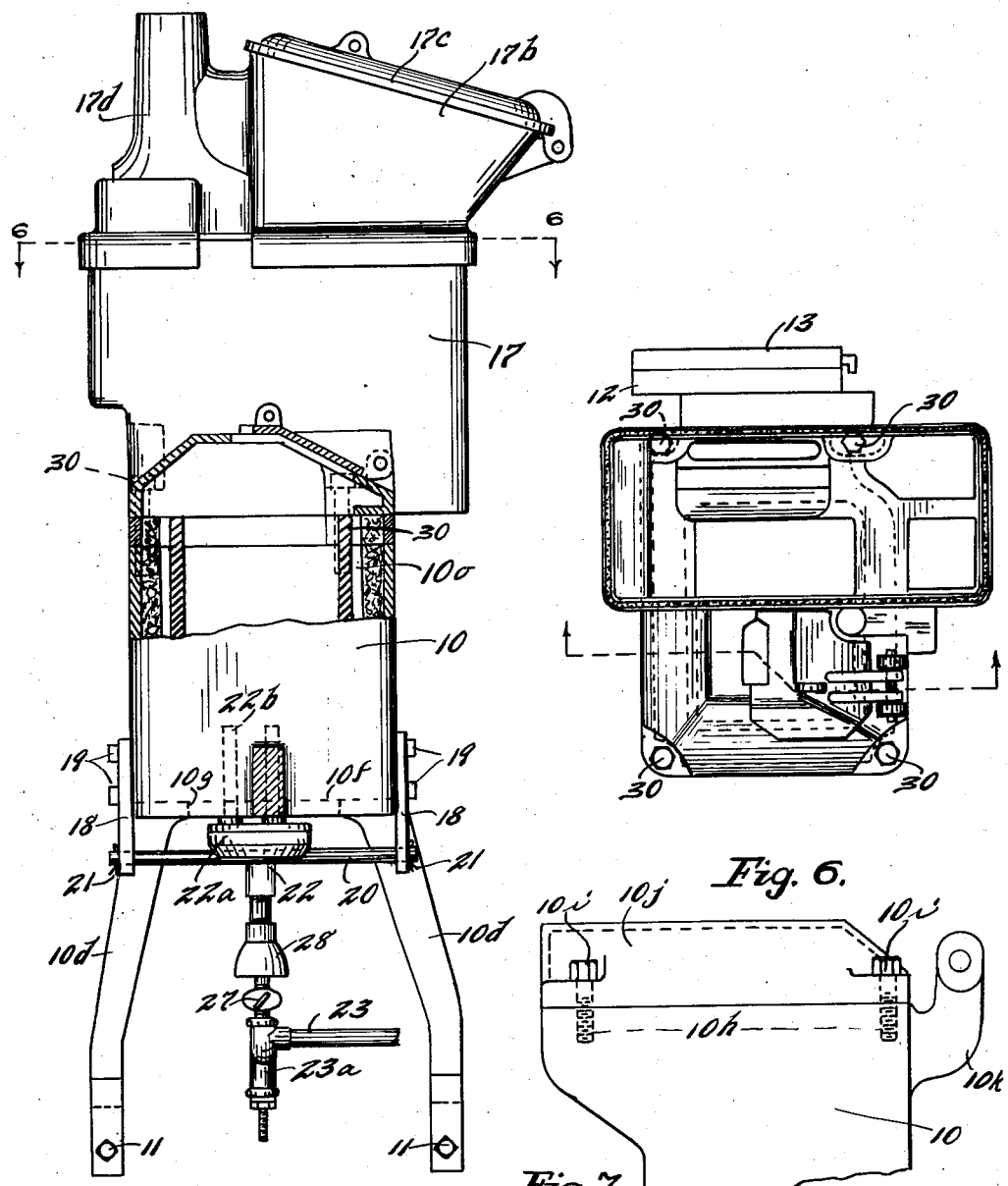
Fig. 5 is a view taken substantially on line 5—5 of Fig. 1 as indicated by the arrows.
Fig. 6 is a horizontal section taken on line 6—6 of Fig. 5.
Fig. 7 is a partial view in side elevation of the original electrically heated machine.

Referring to the drawings, a melting pot casing 10 is shown having its top of substantially rectangular form in plan, the same having substantially vertical side walls 10a, a vertical end wall 10b and another end portion 10c having an inclined throat portion between upper and lower vertical portions. Casing 10 has extending downwardly and outwardly from each side thereof, supporting leg members 10d. Each member 10d is bifurcated at its lower end to embrace a suitable support on the type setting machine and is provided with holding set screws 11. Casing 10 is also shown as having lugs 10k at one end for suitable connection to the type setting machine but which need not be further described. Casing 10 also has secured thereto an extension 10m having a dovetailed projection 10n engaged by a suitable mouthpiece 13 through which the metal passes. Casing 10 has therein a crucible 14 or melting pot proper. Crucible 14 has substantially vertical walls spaced from the walls of casing 10 and substantially parallel thereto, said walls extending some distance above the walls 10a and 10b of casing 10 so that the top of the crucible, which is in substantially one horizontal plane, is some distance above the plane of the top of casing 10. Crucible 14 and casing 10 have a discharge throat portion or passage 10e extending along the inclined side 10c of casing 10. Casing 10 is provided with a closing plate 10f at its bottom.

In one standard form of type setting machine of the electrically heated type, the casing 10 is provided with a cover 10j secured by bolts 10i extending into tapped holes 10h as shown in Fig. 7 and an electrical heating element (not shown) is provided for crucible 14 extending about said crucible in the space between the walls of said crucible and casing 10. It will be noted that cover 10j does not have a vent stack. Such a machine is not adapted to be heated by gas.

In changing the machine, cover 10j is removed and the casing 10 is then built up to the height of crucible 14 and for this purpose members 15 and 16 are provided constructed and arranged to extend about the sides 10a and 10b of casing 10 and along the throat portion 10e thereof, said members being provided with holes 15a and 16a, respectively, to receive fastening means and said members have their top surfaces constructed and arranged to receive and support a cover 17 comprising a vent means and which may include an auxiliary melting pot structure. An opening 10g is made in the bottom of casing 10 beneath crucible 14. A pair of brackets 18 are provided and bolted to the sides of casing 10 by bolts 19. The brackets 18 are apertured at their lower ends to receive and have extending therebetween a rod 20, the same being held in place by any suitable means, such as the split keys 21 at the outer sides of brackets 18. A gas burner 22 is provided having a groove in its bottom surface fitting over rod 20 so as to be supported thereby, said burner 22 being disposed below opening 10g and beneath crucible 14. Burner 22 has a main burner portion 22a for heating the bottom of crucible 14 and has a pair of tubes 22b extending upwardly therefrom and also forming a burner adapted to heat the throat portion 10e of crucible 14. Burner 22 is supplied with gas by a pipe 23 having branches 24 and 25 controlled respectively by the valves 26 and 27 and having thereon the usual air-regulating members 28. Pipe 24 supplies gas to the burner 22b and pipe 25 supplies gas to main burner portion 22a. A burner 12 is also provided for heating the mouthpiece 13, which burner extends horizontally beneath said mouthpiece and is supported by a pair of brackets 12a bolted to each side of casing 10 and projecting therefrom. One bracket is apertured to have the end of burner 12 supported therein and the other bracket is apertured to receive a supply pipe 12b which is connected to the fitting 23a to which the gas supply pipe 23 is connected. Pipe 12b is provided with a suitable valve 12c and with the usual air-regulating valve 12d. Burner 12 is shown as having a series of holes 12e therein through which the gas passes to be ignited.

The space between crucible 14 and casing 10 is preferably provided with material 29 forming a poor conductor of heat. A passage 10o is formed about crucible 14 which leads from the opening in its bottom adjacent burner 22 to the cover 17 and vent stack 17d, for carrying off the products or gases of combustion from said burner.

The casing 17 comprises a metal receiving and melting portion 17a and a hopper portion 17b, the latter having a hinged lid 17c. Casing 17 also has an exhaust stack or chimney 17d which is a necessary element for a gas heated machine. Member 17 has a flange 17e extending partially thereabout particularly at the corners and said flange has four holes provided therein adapted to aline with holes 15a and 16a in members 15 and 16, respectively, and with the tapped holes 10h in casing 10. Bolts or screws 30 extend through the holes in flange 17e and through the holes 15a and 16a, thus fastening bars 15 and 16 and member 17 securely to casing 10 so that there is a continuous wall from casing 10 to casing 17.

When the parts are in position as described, the machine has been converted from an electrically heated melting pot type to a gas heated melting pot type capable of functioning efficiently as a gas heated machine. The crucible 14 can now be heated with the gas burner 22a and the mouthpiece 13 can be heated by burner 12. The throat can be heated by the burner 22b. The gases of combustion from burners 22a and 22b will pass through the passage 10o to stack 17d. The insulating material 29 between the walls 10a and 10b and the crucible 14 insures that the crucible will be well insulated. The type metal is now placed in the hopper 17b and melted in the auxiliary melting pot in casing 17. It is fed from casing 17 into the lower melting pot or crucible 14 which now becomes the second melting pot. There are a great many advantages in having the auxiliary melting pot structure. All of the dross is kept in the auxiliary melting pot as the metal is fed to the lower pot from the bottom. A constant supply of metal can be maintained in the lower pot by automatic means and a preliminary smelting or remelting of the used type metal and waste metal is not necessary. While various types of covers having means for carrying off the gases of combustion might be used, in the embodiment of the invention illustrated, a cover having an auxiliary melting pot has preferably been shown.

From the above description it is seen that applicant has invented a simple and ingenious method of constructing a gas heated melting pot structure which results in a novel and useful product. The invention has been amply demonstrated in actual practice and has been found to be very successful and efficient.

It will, of course, be understood that various changes may be made in the form, details, arrangement and proportions of the device and in the steps and sequence of steps of the method of making the same without departing from the scope of applicant's invention, which, generally stated, consists in a process and product capable of carrying out the objects above set forth, such as disclosed and defined in the appended claims.

What is claimed is:—

1. A melting pot structure for a type setting machine having in combination, a melting pot casing, a melting pot crucible therein having walls spaced from the walls of said casing and extending above the top of said casing, means shaped to fit the top of said casing and formed at its top to receive a cover comprising a vent means and having its top substantially flush horizontally with the top of said crucible, said casing having an opening therein under said crucible, a gas burner carried by said casing and disposed thereunder in vertical alinement with said opening and crucible, a cover disposed on said means comprising a vent means for carrying away products of combustion, said casing having a passage leading from said burner to said vent means and fastening means extending through said cover and said first mentioned means and into said casing for securing said cover in place.

2. A melting pot structure for a type setting machine having in combination, a melting pot casing, a melting pot crucible therein having walls spaced from the walls of said casing and extending above the top of said casing, bars shaped to fit the top of said casing and having top surfaces substantially flush horizontally with the top of said crucible and constructed and arranged to receive and support a cover, said casing having an opening in its bottom under said crucible, brackets secured to said casing, a gas burner carried by said brackets and disposed in vertical alinement with said opening and crucible, a cover having a vent stack thereon supported on said bars, said casing having a passage leading from said burner to said stack and fastening means securing said cover and bars to said casing.

3. A melting pot structure for a type setting machine having in combination, a melting pot casing, a melting pot crucible therein having walls spaced from the walls of said casing and extending above the top of said casing, a pair of bars shaped to be disposed upon and extend around the edge of said casing, said bars having their top surfaces substantially flush horizontally with the top of said crucible and adapted to receive a cover, said casing having an opening beneath said crucible, brackets secured to the sides of said casing, a member extending between said brackets, a gas burner supported on said member vertically alined with said opening and crucible, a quantity of material forming a poor conductor of heat disposed between said casing and crucible, a cover comprising a vent stack and an auxiliary melting pot disposed on said bars and fastening means securing said cover and bars to said casing.

4. The method of converting an electrically heated melting pot structure for a type setting machine comprising a melting pot casing having a crucible therein spaced from the walls thereof and extending above the top thereof and having electrical heating means for said crucible, which consists in removing said electrical heating means, building up the top of said casing to be flush horizontally with the top of said crucible with means adapted to receive and support a cover comprising a vent means, securing a cover having a vent means for the products of combustion to said last mentioned means, supporting a gas burner from said casing beneath the same and said crucible in position to heat said crucible and providing a passage in said casing to said vent means whereby a gas heated device is provided.

5. The method of converting an electrically heated melting pot structure for a type setting machine comprising a melting pot casing having a closed bottom and having a crucible therein extending above the top of said casing and having electrical heating means for said crucible, into a gas heated structure which consists in removing said electrical heating means, placing means on top of said casing adapted to receive a cover having a vent stack thereon, forming an opening in the bottom of said casing below said crucible, securing brackets to the sides of said casing, supporting a gas burner on said brackets below said opening and crucible, placing a cover comprising a vent stack on said means, providing a passage between said burner and vent stack and securing said cover and said means to said casing.

6. The method of converting an electrically heated melting pot structure for a type setting machine comprising a melting pot casing having a closed bottom and having a crucible extending above the top of said casing and having electrical heating means for said crucible, into a gas heated structure which consists in removing said electrical heating means, placing a pair of bars on top of said casing having top surfaces substantially flush horizontally with the top of said crucible and adapted to receive a cover comprising a vent means, forming an opening in the bottom of said casing below said crucible, securing brackets to the sides of said casing, providing means extending between said brackets, supporting a gas burner on said means below said opening and crucible, placing a cover comprising a vent stack on said bars, providing a passage from said burner to said stack through said casing and securing said cover and said bars to said casing.

7. The method of converting an electrically heated melting pot structure for a type setting machine comprising a melting pot casing having a crucible therein extending above the top thereof having an electrical heating means for said crucible and a closed cover, into a gas heated machine which consists in removing said cover and electrical heating means, building up the top of said casing to be flush horizontally with the top of said crucible with means adapted to receive and support a cover having a vent means thereon, securing a cover having a vent means thereon through which the products of combustion may escape to said last mentioned means, supporting a gas burner from said casing beneath the same and said crucible in position to heat said crucible and providing a passage through said casing to said vent means to carry off the products of combustion from said gas burner whereby a gas heated device is provided.

8. The method of converting an electrically heated melting pot structure for a type setting machine comprising a melting pot casing having a crucible therein extending above the top thereof, having an electrical heating means for said crucible and a closed cover, into a gas heated machine which consists in removing said cover and electrical heating means, building up the top of said casing, placing a cover on said casing and crucible having a vent means thereon for carrying off the products of combustion, supporting a gas burner beneath said crucible in position to heat the same and providing a passage for the products of combustion from said gas burner to said vent means.

9. The method of converting an electrically heated melting pot for a type setting machine comprising a melting pot casing having a throat and a mouthpiece, having a crucible therein extending above the top thereof, an electrically heated means for said crucible and a closed cover, into a gas heated machine, which consists in removing said cover and electrical heating means, building up the top of said casing, placing a cover on said casing over said crucible having a vent means thereon for carrying off the gases of combustion, supporting a gas burner beneath said crucible in position to heat the same, supporting a gas burner beneath said throat portion, another gas burner beneath said mouthpiece and providing a passage for the gases of combustion from said first mentioned burner through said casing to said vent means.

10. The method of converting an electrically heated melting pot structure for a type setting machine comprising a melting pot casing having a mouthpiece thereon, a crucible in said casing extending above the top thereof, an electrical heating means for said crucible, and a closed cover for said casing, into a gas heated machine which consists in removing said cover and electrical heating means, building up the top of said casing, placing a cover on said casing over said crucible having a vent means thereon for carrying off the gases of combustion, supporting a gas burner beneath said crucible in position to heat the same, securing brackets to the sides of said casing adjacent said mouthpiece, supporting a gas burner on said brackets beneath said mouthpiece and providing a passage for the gases of combustion from said first mentioned gas burner to said vent means.

LEONARD G. OLANDER.